US006472449B1

(12) United States Patent
Heinemann et al.

(10) Patent No.: US 6,472,449 B1
(45) Date of Patent: Oct. 29, 2002

(54) COMPRESSED, RIGID POLYURETHANE FOAMS

(75) Inventors: Torsten Heinemann, Siegburg (DE); Karl-Werner Dietrich, Odenthal (DE); Walter Klän, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/958,775

(22) PCT Filed: Apr. 7, 2000

(86) PCT No.: PCT/EP00/03119

§ 371 (c)(1),
(2), (4) Date: Oct. 12, 2001

(87) PCT Pub. No.: WO00/63281

PCT Pub. Date: Oct. 26, 2000

(30) Foreign Application Priority Data

Apr. 20, 1999 (DE) .......................................... 199 17 787

(51) Int. Cl.$^7$ ................................................ C08G 18/48
(52) U.S. Cl. ...................... 521/170; 264/45.1; 264/101; 264/239; 521/155
(58) Field of Search ................................. 521/155, 170; 264/45.1, 101, 239

(56) References Cited

U.S. PATENT DOCUMENTS

| 4,816,494 A | 3/1989 | Watson, Jr. et al. ......... 521/137 |
| 5,250,579 A | 10/1993 | Smits et al. ................... 521/98 |
| 5,312,846 A | 5/1994 | Smits et al. ................. 521/134 |
| 5,350,777 A | 9/1994 | Yuge et al. .................. 521/117 |
| 5,578,656 A | 11/1996 | Gillis et al. .................. 521/166 |
| 5,614,566 A | 3/1997 | Burkhart et al. ............. 521/132 |
| 5,703,136 A | 12/1997 | Gillis et al. .................. 521/128 |
| 5,730,896 A | 3/1998 | Gillis et al. ............. 252/182.23 |
| 5,844,014 A | 12/1998 | Malone ....................... 521/146 |
| 5,856,678 A * | 1/1999 | Smits et al. .............. 252/182.2 |
| 6,136,878 A * | 10/2000 | Free et al. ................... 521/137 |

FOREIGN PATENT DOCUMENTS

| WO | 97/27986 | 8/1997 |

* cited by examiner

*Primary Examiner*—John M. Codney, Jr.
(74) *Attorney, Agent, or Firm*—Joseph C. Gil; Lyndanne M. Whalen

(57) ABSTRACT

Compressed polyurethane or polyisocyanurate foams useful as support materials for vacuum insulation units are produced by compressing an open-cell rigid polyurethane or polyisocyanurate to 5–95% of its original volume after 80–200% of the fiber time.

7 Claims, No Drawings

COMPRESSED, RIGID POLYURETHANE FOAMS

BACKGROUND OF THE INVENTION

The present invention relates to a process for the preparation of compressed polyurethane rigid foams and to the use thereof as support materials for vacuum insulation units.

By removing air and other gases as fully as possible from a porous moulded article, the insulation properties thereof can be improved substantially. This effect is utilised in vacuum insulation units. An example thereof is that of vacuum panels which may be used to reduce the energy consumption of refrigerators. In order to produce said panels, a largely open-cell substrate is evacuated and surrounded by a permneation-tight casing. The properties of the substrate are of great importance for the performance characteristics of the vacuum panel. The proportion of open cells must be as high as possible in order to permit rapid and complete gas removal. It must have a high compressive strength so that the vacuum panel may withstand the external air pressure. The cells of the substrate must be as small as possible so that good insulation properties may be obtained even at internal pressures that are industrially easy to achieve.

It is well known to use open-cell polyurethane rigid foams of the kind described, e.g., in U.S. Pat. No. 5,350,777, EP-A-498 628, DE-A-43 03 809, U.S. Pat. Nos. 5,250,579 and 5,312,846, as support material for vacuum insulation units. A disadvantage of said rigid foams is their relatively large cell diameter which necessitates evacuating the moulded article filled therewith to very low pressures, this being associated with a high level of technical complexity.

U.S. Pat. No. 5,844,014 teaches that the insulation properties of evacuated open-cell foams of thermoplastics may be improved by compressing the foam. Polyurethane rigid foams are thermosets, however, so during a standard compression process their structure is destroyed to such an extent that the high compressive strength required for vacuum insulation units is no longer obtained.

SUMMARY OF THE INVENTION

It has now been found that it is possible to prepare fine-cell, open-cell polyurethane rigid foams if the foamed polyurethane foam is compressed shortly before or after the fibre time has ended.

DETAILED DESCRIPTION OF THE INVENTION

The invention provides, therefore, a process for the preparation of fine-cell polyurethane or polyisocyanurate rigid foams wherein 1. an open-cell polyurethane or polyisocyanurate rigid foam is prepared by mixing a suitable polyol formulation with a polyisocyanate, and
2. the polyurethane or polyisocyanurate rigid foam thus obtained is compressed to 5% to 95%, preferably 30% to 70%, particularly preferably 40% to 60% of its starting volume after 80% to 200%, preferably 100% to 150%, particularly preferably 105% to 130% of the fibre time.

In the first step of the process according to the invention, an open-cell polyurethane or polyisocyanurate rigid foam is prepared in a manner known in principle to the skilled person by mixing a polyisocyanate with a suitable polyol component which may also contain blowing agents, catalysts and other auxiliaries, e.g., foam stabilisers, antioxidants etc. According to the invention, the polyurethane or polyisocyanurate rigid foam prior to compression has an average cell diameter of less than 250 $\mu$m, preferably less than 150 $\mu$m and a volume proportion of open cells measured to DIN ISO 4590-92 from 50% to 100%, preferably 80% to 100%.

In order to achieve the functionality required for foaming, polyol formulations according to the invention contain at least one polyol having at least two hydrogen atoms which are reactive towards isocyanates and having a number-average molecular weight from 150 to 12,500 g/mole, preferably 200 to 1500 g/mole. Such polyols may be obtained by polyaddition of alkylene oxides such as, for example, ethylene oxide, propylene oxide, butylene oxide, dodecyl oxide or styrene oxide, preferably propylene oxide or ethylene oxide, to starter compounds such as water or polyhydric alcohols such as sucrose, sorbitol, pentaerythritol, trimethylolpropane, glycerol, propylene glycol, ethylene glycol, diethylene glycol and mixtures of the starter compounds mentioned. Suitable starter compounds also include ammonia or compounds having at least one primary, secondary or tertiary amino group, for example, aliphatic amines such as ethylenediamine, oligomers of ethylenediamine (e.g. diethylenetriamine, triethylenetetramine or pentaethylenehexamine), ethanolamine, diethanolamine, triethanolamine, N-methyl or N-ethyl diethanolamine, 1,3-propylenediamine, 1,3-or 1,4-butylenediamine, 1,2-hexamethylenediamine, 1,3-hexamethylenediamine, 1,4-hexamethylenediamine, 1,5-hexamethylenediamine or 1,6-hexamethylenediamine, aromatic amines such as phenylenediamines, diaminotoluenes (2,3-diaminotoluene, 3,4-diaminotoluene, 2,4-diaminotoluene, 2,5-diaminotoluene, 2,6-diaminotoluene or mixtures of said isomers), 2,2'-diaminodiphenylmethane, 2,4'-diaminodiphenylmethane, 4,4'-diaminodiphenylmethane or mixtures of said isomers. The polyol formulation contains from 0 to 95 parts by weight, preferably from 10 to 40 parts by weight of said component.

Polyol formulations according to the invention may also contain polyester polyols having a number-average molecular weight from 100 to 30,000 g/mole, preferably 150 to 10,000 g/mole, particularly preferably 200 to 600 g/mole which may be prepared from aromatic and/or aliphatic dicarboxylic acids and polyols having at least two hydroxyl groups. Examples of dicarboxylic acids include phthalic acid, fumaric acid, maleic acid, azelaic acid, glutaric acid, adipic acid, suberic acid, terephthalic acid, isophthalic acid, decane dicarboxylic acid, malonic acid, glutaric acid and succinic acid. Individual dicarboxylic acids or any mixtures of different dicarboxylic acids may be used. Instead of free dicarboxylic acids it is also possible to use the corresponding dicarboxylic acid derivatives such as, e.g., dicarboxylic acid mono- or diesters of alcohols having one to four carbon atoms or dicarboxylic acid anhydrides. Examples of the preferred alcohol component for esterification include: ethylene glycol, diethylene glycol, triethylene glycol, tetraethylene glycol, propane 1,2-diol, propane 1,3-diol, butane 1,4-diol, pentane 1,5-diol, hexane 1,6-diol, decane 1,10-diol, glycerol, trimethylolpropane or mixtures thereof. The polyol formulations according to the invention may also contain polyether esters of the kind obtained, e.g., according to EP-A-250 967 by reaction of phthalic anhydride with diethylene glycol and afterwards with ethylene oxide. The polyol formulation may contain from 0 to 90 parts by weight, preferably 5 to 30 parts by weight of polyester polyol.

The polyol formulations according to the invention also contain at least one catalyst in amounts from 0 to 10 parts by weight, preferably 0.5 to 5 parts by weight. The catalysts customarily used in polyurethane chemistry may be used according to the invention. Examples of such catalysts include: triethylenediamine, N,N-dimethylcyclohexylamine, tetramethylenediamine, 1-methyl-4-dimethylaminoethylpiperazine, triethylamine, tributylamine, dimethylbenzylamine, N,N',N''-tris-(dimethylaminopropyl)-hexahydrotriazine, diemethylaminopropyl formamide. N,N,N',N'-tetramethylethylenediamine, N,N,N',N'-tetramethylbutanediamine, tetramethylhexanediamine, pentamethyldiethylenetriamine, tetramethyldiaminoethyl ether, dimethylpiperazine, 1,2-dimethylimidazole, 1-azabicyclo[3.3.0]octane, bis-(dimethylaminopropyl)urea, N-methylmorpholine, N-ethylmorpholine, N-cyclohexylmorpholine, 2,3-dimethyl-3,4,5,6-tetrahydropyrimidine, triethanolamine, diethanolamine, triisopropanolamine, N-methyldiethanolamine, N-ethyldiethanolamine, dimethylethanolamine, tin-(II)acetate, tin-(II)-octoate, tin-(II)-ethylhexoate, tin-(II)-laurate, dibutyltin diacetate, dibutyltin dilaurate, dibutyltin maleate, dioctyltin diacetate, tris-(N,N-dimethylaminopropyl)-s-hexahydrotriazine, tetramethylammonium hydroxide, potassium acetate, sodium acetate, sodium hydroxide or mixtures of these or similar catalysts.

According to the invention it is also possible to incorporate ionic and nonionic emulsifiers in amounts from 0 to 10 parts by weight, preferably 0.5 to 2 parts by weight. Such emulsifiers are described, for example, in "Römpp Chemie Lexikon", Vol. 2. Thieme Verlag, Stuttgart, 9th edition 1991, p. 1156 ff.

The polyol component according to the invention contains from 0.1 to 10 parts by weight, preferably 0.5 to 5 parts by weight of water. The isocyanate component used may be aromatic polyisocyanates of the kind described in Justus Liebigs Annalen der Chemie, 562 (1949) 75, for example, those having the formula

wherein
n may assume values from 2 to 4, preferably 2, and Q means an aliphatic hydrocarbon radical having 2 to 18, preferably 6 to 10 carbon atoms, a cycloaliphatic hydrocarbon radical having 4 to 15, preferably 5 to 10 carbon atoms, an aromatic hydrocarbon radical having 8 to 15, preferably 8 to 13 carbon atoms.

Polyisocyanates of the kind described in DE-OS 28 32 253 are preferred.

As a rule, the polyisocyanates which are industrially easy to obtain are particularly preferred, e.g., 2,4- and 2,6-toluene diisocyanate and any mixtures of said isomers ("TDI"), polyphenylpolymethylene polyisocyanates of the kind prepared by aniline-formaldehyde condensation followed by phosgenation ("crude MDI") and polyisocyanates having carbodiimide groups, urethane groups, allophanate groups, isocyanurate groups, urea groups or biuret groups ("modified polyisocyanates"), particularly modified polyisocyanates derived from 2,4- and 2,6-toluene diisocyanate or from 4,4'- and/or 2,4'-diphenylmethane diisocyanate.

It is also possible to use prepolymers of the aforementioned isocyanates and organic compounds having at least one hydroxyl group. Examples of suitable hydroxyl compounds include polyols or polyesters having one to 4 hydroxyl groups and (number-average) molecular weights from 60 to 1,400.

It is also possible to incorporate paraffins or fatty alcohols or dimethylpolysiloxanes and pigments or dyes, and also stabilisers to prevent the effects of ageing and weathering, plasticisers and fungistatic and bacteriostatic substances and fillers such as barium sulfate, kieselguhr, carbon black or whiting. These are mostly added to the polyol component in amounts from 0 to 10 parts by weight, preferably 0 to 5 parts by weight.

Further examples of optionally incorporated surfactant additives and foam stabilisers and cell regulators, reaction inhibitors, stabilisers, flame retardants, dyes and fillers and fungistatic and bacteriostatic substances and details about the use and mode of action of said additives are described in Vieweg/Höchtlen (eds.): "Kunststoff-Handbuch", vol, VII, Carl Hanser Verlag, Munich 1966, pages 121 to 205, and G. Oertel (eds.) "Kunststoff-Handbuch" vol. VII, Carl Hanser Verlag, 2nd edition, Munich 1983.

The polyurethane or polyisocyanurate rigid foam obtained in the first step of the process according to the invention is compressed to 5% to 95%, preferably 30% to 70%, particularly preferably 40% to 60% of its starting volume after 80% to 200%, preferably 100% to 150%, particularly preferably 105% to 130% of the fibre time. The fibre time is the time after which, during polyaddition between polyol and polyisocyanate, a theoretically infinitely expanded polymer is obtained. The fibre time can be determined experimentally by immersing a thin wooden rod into the foaming reaction mixture at short intervals. The time from the mixing of the components to the time when filaments remain suspended on the rod when it is withdrawn is the fibre time. This procedure is commenced preferably only a few seconds before the expected fibre time. In the event of mechanical mixing, the fibre time of polyurethane foams which may be used industrially is usually 25 to 100 seconds. The foam may be carried out batchwise, e.g. in a press operated manually or automatically, or continuously, e.g., by guiding the foam through rolls on a conveyor belt. The polyurethane moulded articles thus obtained have very small average cell diameters. As a result, at a given pressure, they have a lower thermal conductivity than the non-compressed moulded articles.

Substrates for vacuum insulation units develop their greatest insulation effect when the pressure drops below the so-called "critical pressure" at which the average free length of passage of the gas molecules becomes greater than the cell diameter. The substrates currently used for vacuum insulation units have to be evacuated for a very long time until the critical pressure is reached. In contrast, the pressure in the substrates prepared by the process according to the invention falls to 50% or more below the critical pressure within a short time.

The invention also provides the use of the rigid foams prepared by the process according to the invention in vacuum insulation units, e.g., as filler substrates for vacuum insulation panels or other evacuated articles provided with a permeation-tight envelope. During its manufacture the entire rigid foam may be evacuated temporarily or permanently during or after compression.

EXAMPLES

The following starting products were used in the Examples:

Polyol A: Polyethylene oxide polyether ($M_n$=300) based on trimethylolpropane
Polyol B: Polyether ester ($M_n$=375) based on phthalic anhydride, diethylene glycol and ethylene oxide Polyol C: Castor oil Isocyanate: Polyphenylpolymethylene polyisocyanate NCO content 31.5 wt. % (Desmodur® 44V20, Bayer AG)

Stabiliser: Silicone stabiliser (Tegostab® B 8404, Th. Goldschmidt AG, D-45127 Essen)

Emulsifier: Sodium sulfate salt of an ethoxylated fatty acid alcohol, 30% in water (Servo Delden B. V., NL-7491 AE Delden)

Catalyst 1: dimethylcyclohexylamine

Catalyst 2: Potassium acetate (25 wt. % in diethylene glycol)

Foaming takes place on a high pressure machine (HK 165, Hennecke GmbH, D-53757 Sankt Augustin)

Example 1

Comparison Example 100 parts by wt. of a mixture of 19.2 parts by wt. of polyol A, 19.7 parts by wt. of polyol B, 57.7 parts by wt. of polyol C, 0.8 parts by wt. of catalyst 1, 0.9 parts by wt. of catalyst 2, 3.6 parts by wt. of emulsifier, 0.9 parts by wt. of water and 1.4 parts by wt. of stabiliser were reacted with 127 parts by wt. of isocyanate.

The fibre time of the reaction mixture was 35 seconds. A polyurethane rigid foam with a free density of 35 kg/m$^3$, a volume percentage of open cells measured to DIN ISO 4590-92 of 99.5%, a thermal conductivity of 12.5 mW/m.K at a pressure of 0.7 mbar and a compressive strength determined to DIN 53421-84 of 0.2 MPa was obtained. In order to evacuate a rigid foam sample having the dimensions 40×40×3 cm$^3$ to the stated pressure, two hours' evacuation with a rotary vane pump with an intake capacity of 1 m$^3$/h were required.

Example 2

According to the Invention

The test from Example 1 was repeated, the foam being compressed 5 seconds after the end of the fibre time to 50% of its original freely foamed volume. The polyurethane rigid foam obtained had a free density of 70 kg/m$^3$, a volume percentage of open cells measured to DIN ISO 4590-92 of 98%, a thermal conductivity of 7.8 mW/m.K at a pressure of 0.7 mbar and a compressive strength determined to DIN 53421-84 of 0.5 MPa. In order to evacuate a rigid foam sample having the dimensions 40×40×3 cm$^3$ to the stated pressure, ten minutes' evacuation with a rotary vane pump with an intake capacity of 1 m$^3$/h were required.

Example 3

Comparison Example

The foam obtained in Example 1 was compressed to 50% of its original freely foamed volume 24 hours after the end of the fibre time. The surface of the polyurethane moulded article thus obtained was soft and unstable. It had a compressive strength determined to DIN 53421-84 of 0.14 MPa.

The examples show that polyurethane moulded articles with outstanding insulating properties under vacuum with simultaneously high compressive strength are obtained by the process according to the invention.

What is claimed is:

1. A process for the production of a fine-cell polyurethane or polyisocyanurate rigid foam comprising
   a) reacting a polyol with a polyisocyanate in the presence of a blowing agent to produce an open-cell polyurethane or polyisocyanurate rigid foam and
   b) compressing the open-cell foam to from 5 to 95% of its starting volume after 80–200% of the fiber time.

2. The process of claim 1 in which step b) is carried out after 100–150% of the fiber time.

3. The process of claim 1 in which the rigid foam is evacuated during compression.

4. A rigid polyurethane or polyisocyanurate foam produced by the process of claim 1.

5. A rigid polyurethane or polyisocyanurate foam produced by the process of claim 3.

6. A vacuum insulation unit produced from the foam of claim 4.

7. A vacuum insulation unit produced from the foam of claim 5.

* * * * *